United States Patent [19]

Chijiiwa et al.

[11] Patent Number: 5,723,089
[45] Date of Patent: Mar. 3, 1998

[54] LINE PIPE METAL ARC WELDED WITH WIRE ALLOY

[75] Inventors: Rikio Chijiiwa, Kimitsu; Hiroyuki Ogawa; Koichi Shinada, both of Futtsu; Yoshinori Ogata, Kimitsu; Hiroshi Tamehiro, Futtsu; Hajime Ishikawa, Kimitsu; Isamu Kimoto, Futtsu; Yoshio Terada, Kimitsu, all of Japan

[73] Assignee: Nippon Steel Corporation, Tokyo, Japan

[21] Appl. No.: 824,079

[22] Filed: Mar. 24, 1997

Related U.S. Application Data

[62] Division of Ser. No. 545,850, PCT/JP95/00412 filed as Mar. 13, 1995, abandoned.

[30] Foreign Application Priority Data

Mar. 11, 1994 [JP] Japan ................ 6-066538
May 11, 1994 [JP] Japan ................ 6-120746

[51] Int. Cl.$^6$ ............................................. C22C 38/28
[52] U.S. Cl. ........................... 420/104; 420/110; 148/909
[58] Field of Search ...................... 420/104, 110; 148/333, 334, 335, 909; 219/61, 146.23; 228/262.4, 262.41

[56] References Cited

U.S. PATENT DOCUMENTS 3,802,874  4/1974  Nelson et al. ............ 420/120
3,860,777  1/1975  Sawhill .................... 219/61

FOREIGN PATENT DOCUMENTS

| 560375 | 9/1993 | European Pat. Off. . | |
| 49-24778 | 6/1974 | Japan | 420/110 |
| 0089432 | 7/1980 | Japan | 148/333 |
| 63-32558 | 6/1988 | Japan . | |
| 3-110071 | 5/1991 | Japan . | |
| 3-211230 | 9/1991 | Japan . | |
| 4-51274 | 8/1992 | Japan . | |
| 2090615 | 7/1982 | United Kingdom | 420/104 |

OTHER PUBLICATIONS

Patent Abstracts of Japan, vol. 17, No. 037 (C-1019), Jan. 25, 1993 & JP 04 254521 A (Nippon Steel Corp.), Sep. 9, 1992.

Journal of the Japanese Association for Petroleum Technology Oct. 19, 1984.

*Primary Examiner*—Deborah Yee
*Attorney, Agent, or Firm*—Kenyon & Kenyon

[57] ABSTRACT

A wire for gas metal arc welding containing 0.01 to 0.06 wt % of C, 0.10 to 0.60 wt % of Si, 0.9 to 3.1 wt % of Mn, 0.7 to 2.0 wt % of Cr, 0.005 to 0.06% of Ti, not greater than 0.08 wt % of Al and if necessary, 0.05 to 0.30 wt % of Cu, and the balance of Fe and unavoidable impurities. This wire improves the selective corrosion resistance and the low temperature toughness of the resulting weld metal, and is particularly suitable for circumferential welding of line pipes for transporting $CO_2$-containing petroleum, natural gases or $CO_2$.

3 Claims, No Drawings

LINE PIPE METAL ARC WELDED WITH WIRE ALLOY

This application is a division of application Ser. No. 08/545,850 filed Nov. 13, 1995, now abandoned which is a 35 U.S.C. §371 of PCT/JP95/00412 filed Mar. 13, 1995.

TECHNICAL FIELD

This invention relates to a wire for gas metal arc welding which is suitable for circumferential welding of a low alloy line pipe for transporting oil and natural gas containing $CO_2$ or $CO_2$ gas.

More particularly, this invention relates to a wire for gas shield arc welding providing selective corrosion resistance and excellent low temperature toughness to a weld metal.

BACKGROUND ART

Excellent low temperature toughness and high field weldability are required, in addition to a high strength, for line pipes for transporting oil and gases in cold districts and their off-shore transportation. Further, because $CO_2$ gas injection operations and exploitation of deep wells have been carried out in recent years so as to recover secondary and tertiary crude oil, an inhibitor effect drops, so that corrosion of line pipes by $CO_2$ gas has become a serious problem. Therefore, $CO_2$ corrosion resistance in line pipes is now required.

It has been known publicly before this date that the addition of Cr is effective in preventing $CO_2$ corrosion (Journal of the Japanese Association for Petroleum Technology, Vol. 50, No. 2, FIGS. 9 and 10). On the other hand, Japanese Unexamined Patent Publication (Kokai) No. 3-211230 proposes a method which adds Cr so as to improve $CO_2$ corrosion resistance of the base metal of steel pipes.

However, a wire for gas metal arc welding, which takes $CO_2$ corrosion and selective corrosion depression of a circumferential weld portion of a line pipe used under a $CO_2$-containing corrosive environment into consideration, has not yet been developed to this date.

DISCLOSURE OF THE INVENTION

It is therefore an object of the present invention to provide a wire for gas metal arc welding which prevents $CO_2$ corrosion and selective corrosion of a circumferential weld metal portion, and provides a weld metal having sufficient strength and toughness.

The inventors of the present invention have conducted intensive studies on corrosion resistance and selective corrosion resistance of a weld portion in a corrosive environment containing $CO_2$ and brine (aqueous NaCl solution) by variously changing chemical compositions of a wire for gas metal arc welding, and have found out the following facts.

(1) From the aspect of corrosion resistance, the C content in the weld metal is preferably low, and to this end, the C content in the wire must be reduced.

(2) The Cr content in the weld metal is nearly equal to the Cr content in the wire. Corrosion resistance becomes higher with the increase in the Cr content in the wire.

(3) When a base metal subjected to controlled rolling is compared with the weld metal, corrosion resistance of the weld metal becomes lower even at the same Cr content because it has a solidification texture. Therefore, a greater quantity of Cr must be added to the weld metal than to the base metal.

(4) A corrosion product is reinforced and corrosion resistance becomes higher by adding Cu.

As a result, the present inventors have invented a wire for gas metal arc welding capable of effectively preventing selective corrosion of a circumferential weld portion by adjusting the chemical compositions of the weld metal portion by using a wire in which C is reduced and to which Cr and, if necessary, Cu, are added.

In other words, the gist of the present invention resides in a wire for gas metal arc welding having excellent $CO_2$ gas corrosion resistance, and made of a low alloy steel containing 0.01 to 0.06 wt % of C, 0.10 to 0.60 wt % of Si, 0.9 to 3.2 wt % of Mn, 0.7 to 2.0 wt % of Cr, 0.005 to 0.06 wt % of Ti, not greater than 0.08 wt % of Al, and if necessary, 0.05 to 0.30 wt % of Cu.

BEST MODE FOR CARRYING OUT THE INVENTION

Hereinafter, the best mode for carrying out the present invention will be explained in detail.

First, the reasons for limitation of the chemical components in the wire for gas metal arc welding in the present invention will be explained.

C

Carbon (C) is added to the wire in order to obtain satisfactory mechanical properties and workability. If the C content is less than 0.010 wt %, granular ferrite and ferrite side plates in the weld metal grow and become coarse, so that strength and toughness drop, and mechanical properties become insufficient in comparison with that of the base metal. Also, the shift of globules becomes unstable and the spatter quantity increases. On the other hand, when the C content exceeds 0.060 wt %, the quantities of carbides, which can serve as cathode sites inside the weld metal, increase, so that $CO_2$ corrosion resistance as well as selective corrosion resistance are deteriorated. Further, the strength of the weld metal becomes excessively greater than that of the base metal, and causes deterioration of toughness. The hardness increases and weld crack susceptibility rises, too. Therefore, the C content to be added to the wire is limited to the range of 0.010 to 0.060 wt %.

Si

At least 0.10 wt % of Si is added as a deoxidizing element. If its content is less than 0.10 wt %, the deoxidization capability drops and weld workability drops, too. If it exceeds 0.060 wt %, the strength of the weld metal becomes excessively greater than that of the base metal, so that deterioration of toughness occurs. Weld crack susceptibility rises with the increase in the hardness. Therefore, the Si content is limited to the range of 0.10 to 0.60 wt %.

Mn

Manganese (Mn) is added to the wire in order to obtain satisfactory mechanical properties and workability. If the Mn content is less than 0.9 wt %, however, the strength of the weld metal becomes insufficient in comparison with that of the base metal, and because annealability drops, toughness drops, too. Particularly when the Mn content is excessively small, blow-holes occur due to insufficient deoxidization. If the Mn content exceeds 3.2 wt %, on the other hand, the hardness of the weld metal rises and its strength becomes excessively higher than that of the base metal, thereby deteriorating of toughness. Therefore, the suitable range of the Mn content is limited to 0.9 to 3.2 wt %.

Cr

Chromium (Cr) is an important element for improving the $CO_2$ corrosion resistance and the selective corrosion resistance and for obtaining satisfactory mechanical properties for the weld metal.

The Cr content of the weld metal is nearly equal to the Cr content of the wire, but because such a weld metal has a solidification structure, its corrosion resistance becomes lower than that of the base metal. Therefore, Cr must be added to the wire in order to improve the corrosion resistance of the weld metal. If the Cr content exceeds 2.00 wt %, however, the strength of the weld metal becomes excessively higher than that of the base metal, so that toughness drops and weld crack occurs. To improve the corrosion resistance of the weld metal, at least 0.70 wt % of Cr must be added. Therefore, the suitable range of the Cr content is limited to 0.70 to 2.00 wt %.

Ti

Titanium (Ti) is added to the wire so as to secure the low temperature toughness of the weld metal. Ti is effective in improving the toughness of the weld metal by making the ferrite fine. If the Ti content is less than 0.005 wt %, however, its effect cannot be obtained. If the Ti content exceeds 0.06 wt %, on the other hand, the amount of the slag increases, thereby posing the problems such as slag inclusion. Therefore, the suitable range of the Ti content is limited to 0.005 to 0.06 wt %.

Al

The amount of Al is limited so as to secure weldability. If the Al content exceeds 0.08%, the slag amount increases and poses the problem such as slag inclusion. Therefore, the Al content is limited to not greater than 0.08 wt %.

Cu

Copper (Cu) is added so as to improve the $CO_2$ corrosion resistance and the selective corrosion resistance of the weld metal and to obtain its satisfactory mechanical properties. Particularly when at least 0.5 wt % of Cu is added, stabler corrosion products are formed due to the combined effect with Cr, and the $CO_2$ corrosion resistance can be further improved. When the Cu content exceeds 0.30 wt %, the strength of the weld metal becomes excessively higher than that of the base metal, so that insufficiency of toughness develops. As the hardness further increases, weld crack susceptibility increases. Accordingly, the suitable range of the Cu content is set to 0.05 to 0.30 wt %.

By the way, the contents of those elements which are contained as unavoidable impurities, are preferably as small as possible. Generally, P, S, O and N are contained as unavoidable impurities, and their contents are not greater than 0.030 wt % of P, not greater than 0.030 wt % of S, not greater than 0.08 wt % of O and not greater than 0.01 wt % of N. In such a range, these elements do not deteriorate the $CO_2$ corrosion resistance and the mechanical properties of the weld metal.

There is the case where Nb, Ni, Mo, Zr, B, etc., are contained besides the elements described above. These elements do not at all exert any adverse influences on the weld metal so long as their contents are not greater than 0.02 wt % of Nb, not greater than 0.02 wt % of V, not greater than 3.0 wt % of Ni, not greater than 1.0 wt % of Mo, not greater than 0.05 wt % of Zr and not greater than 0.002 wt % of B. In other words, when these elements exceed the range described above, the problems such as the occurrence of weld defects (when the elements are P, S, B and N), the drop of the mechanical properties (when the elements are Nb, V, Ni, Mo, N and O), etc., occur.

Next, a welding method using the wire consisting of the elements described above will be explained.

The wire according to the present invention is used particularly when gas metal arc welding is conducted, but the kind of a shield gas used for this welding and the welding condition are not limited. To obtain stable weldability and satisfactory material characteristics of the weld metal, however, the following welding conditions are preferably employed.

shield gas: (2.5–40% $CO_2$)+Ar, or (2–10% $O_2$)+Ar wire diameter: 0.8–1.6 mm welding current: 100–500 A arc current: 15–45 V welding speed: 5–150 cm/min welding position: all positions The kinds of steels, to which gas metal arc welding according to the present invention is applied, are not particularly limited, and all the steels used for the application of this kind may be employed.

EXAMPLES

Next, examples of the present invention will be explained. First, a pipe having an outer diameter of 910 mm was produced from each of the sample steels having the chemical compositions tabulated in Table 1 and a thickness of 25 mm, and gas metal arc welding was carried out by using each of the welding wires having the chemical compositions (the balance being Fe) tabulated in Table 1. The wire had a diameter of 1.2 mmφ. 80% At+20% $CO_2$ was used as a shield gas, and welding was carried out at welding heat input of 4 to 12 kJ/cm.

The results are tabulated in Table 2. TS (tensile strength) was evaluated by using an API flat type tensile testpiece, and toughness was evaluated (vE-30) by absorption energy J at −30° C. by using a JIS No. 4 testpiece. The occurrence of weld cracks was evaluated by inspecting five sections after welding. The welding working property was evaluated from the quantities of fumes, spatters, etc., stability of arc and peelability of the slag. The $CO_2$ corrosion resistance was evaluated by bubbling $CO_2$ at 1 atm in a 10% aqueous NaCl solution, adjusting the temperature to 80° C. and a pH to 5.0, and immersing the testpieces for at least 96 hours. By the way, efforts were made to eliminate as much as possible the weld cracks, the weld defects, blow-holes, and so forth, from the testpieces. However, when the API tensile testpieces could not be easily collected, measurement was regarded as impossible (symbol "-" in Table 2).

As tabulated in Table 2, weld metals having high weldability, high strength, high toughness and excellent $CO_2$ corrosion resistance could be obtained by conducting welding by using the wire for gas metal arc welding according to the present invention.

However, the wires 11 to 22 did not have suitable chemical compositions, and could not provide satisfactory weldability and mechanical properties. Since the C content was small in the wire 11, the strength and toughness were insufficient. Since the C content exceeded in the wire 12, the $CO_2$ corrosion resistance was deteriorated. The Si content was small in the wire 13 but was great in the wire 14. Therefore, weldability was inferior and the low temperature toughness was deteriorated. Since the Mn content was small in the wire 15 but was great in the wire 16, the weldability and the toughness dropped in both cases. Since the Cu content was great in the wire 17, the toughness was deteriorated. In the wire 18, the $CO_2$ corrosion resistance was deteriorated because the Cr content was small. Since the Cr content was great in the wire 19 and since the Ti content was small in the wire 20, the toughness of the weld metals dropped in both cases. Since the Ti content was great in the wire 21 and since the Al content was great in the wire 22, the toughness dropped in both cases.

TABLE 1

| | chemical compositions (wt %; * = ppm) | | | | | | | | | | | | | | | | |
|---|---|---|---|---|---|---|---|---|---|---|---|---|---|---|---|---|---|
| wire | C | Si | Mn | Cu | Cr | Ti | Al | P* | S* | N* | O* | Nb | V | Ni | Mo | Zr* | B* |
| Examples of this Invention | | | | | | | | | | | | | | | | | |
| BM | 0.061 | 0.24 | 1.34 | — | 0.65 | 0.010 | 0.031 | 50 | 10 | 20 | 20 | 0.034 | — | — | — | — | — |
| 1 | 0.011 | 0.10 | 1.41 | 0.28 | 1.95 | 0.042 | 0.065 | 70 | 50 | 30 | 30 | — | — | — | — | 5 | — |
| 2 | 0.025 | 0.32 | 1.73 | 0.24 | 1.00 | 0.031 | 0.029 | 50 | 10 | 25 | 50 | — | — | — | — | — | 3 |
| 3 | 0.019 | 0.15 | 1.81 | — | 1.32 | 0.033 | 0.021 | 100 | 100 | 50 | 150 | 0.002 | — | 0.10 | 0.05 | — | — |
| 4 | 0.038 | 0.44 | 2.91 | — | 0.75 | 0.035 | 0.012 | 150 | 20 | 15 | 15 | — | 0.003 | — | — | — | — |
| 5 | 0.022 | 0.23 | 3.04 | — | 0.75 | 0.038 | 0.043 | 250 | 20 | 10 | 30 | — | — | — | — | — | — |
| 6 | 0.031 | 0.56 | 2.04 | — | 1.63 | 0.021 | 0.033 | 80 | 5 | 40 | 10 | — | — | — | — | — | — |
| 7 | 0.034 | 0.35 | 1.02 | 0.18 | 1.44 | 0.033 | 0.031 | 50 | 2 | 25 | 20 | — | — | — | — | — | — |
| 8 | 0.046 | 0.27 | 1.44 | 0.06 | 1.44 | 0.008 | — | 50 | 5 | 20 | 35 | — | — | — | — | — | — |
| 9 | 0.052 | 0.32 | 2.23 | — | 0.80 | 0.010 | 0.014 | 10 | 2 | 35 | 30 | — | — | — | — | — | — |
| 10 | 0.058 | 0.16 | 0.94 | 0.24 | 1.83 | 0.055 | 0.075 | 50 | 40 | 45 | 80 | — | — | — | — | — | — |
| Comparative Examples | | | | | | | | | | | | | | | | | |
| 11 | 0.003* | 0.35 | 1.02 | 0.13 | 1.20 | 0.021 | 0.035 | 120 | 30 | 30 | 50 | — | — | — | — | — | — |
| 12 | 0.083* | 0.65* | 1.58 | — | 1.42 | 0.046 | 0.023 | 150 | 50 | 35 | 40 | — | — | — | — | — | — |
| 13 | 0.043 | 0.04* | 1.33 | — | 1.36 | 0.043 | 0.023 | 250 | 40 | 20 | 50 | — | — | — | — | — | — |
| 14 | 0.042 | 0.73* | 1.33 | — | 1.37 | 0.037 | 0.010 | 50 | 40 | 20 | 30 | — | — | — | — | — | — |
| 15 | 0.042 | 0.24 | 0.86* | 0.21 | 1.49 | 0.026 | — | 60 | 30 | 20 | 60 | — | — | — | — | — | — |
| 16 | 0.040 | 0.36 | 3.25* | — | 0.72 | 0.012 | 0.035 | 100 | 30 | 30 | 60 | — | — | — | — | — | — |
| 17 | 0.043 | 0.22 | 1.52 | 0.34* | 1.13 | 0.026 | 0.033 | 120 | 50 | 30 | 60 | — | — | — | — | — | — |
| 18 | 0.033 | 0.34 | 2.21 | 0.21 | 0.65* | 0.026 | 0.039 | 120 | 80 | 30 | 30 | — | — | — | — | — | — |
| 19 | 0.053 | 0.40 | 1.11 | 0.11 | 2.06* | 0.035 | 0.050 | 120 | 100 | 30 | 35 | — | — | — | — | — | — |
| 20 | 0.023 | 0.23 | 1.65 | 0.24 | 1.43 | 0.003* | 0.036 | 110 | 100 | 35 | 35 | — | — | — | — | — | — |
| 21 | 0.041 | 0.33 | 1.26 | 0.18 | 1.67 | 0.067* | 0.029 | 150 | 100 | 35 | 30 | — | — | — | — | — | — |
| 22 | 0.034 | 0.39 | 1.33 | 0.19 | 1.88 | 0.039 | 0.086* | 150 | 100 | 35 | 20 | — | — | — | — | — | — |

NOTE)
BM: sample steels (balance: Fe)
*contents outside the range of this invention

TABLE 2

| wire | weldability | weld crack | TS (MPa) | vE-30 (J) | $CO_2$ corrosion resistance corrosion rate (mm/y) |
|---|---|---|---|---|---|
| Examples of this invention | | | | | |
| 1 | ○ | nil | 650 | 112 | 0.34 |
| 2 | ○ | " | 670 | 110 | 0.35 |
| 3 | ○ | " | 620 | 102 | 0.43 |
| 4 | ○ | " | 830 | 112 | 0.45 |
| 5 | ○ | " | 750 | 134 | 0.46 |
| 6 | ○ | " | 810 | 133 | 0.47 |
| 7 | ○ | " | 620 | 112 | 0.36 |
| 8 | ○ | " | 730 | 134 | 0.36 |
| 9 | ○ | " | 790 | 144 | 0.46 |
| 10 | ○ | " | 800 | 91 | 0.33 |
| Comparative Examples | | | | | |
| 11 | ● | " | 460 | 24 | 0.36 |
| 12 | ● | occurred | — | 25 | 0.84 |
| 13 | ● | " | — | 35 | 0.46 |
| 14 | ● | " | — | 32 | 0.43 |
| 15 | ● | nil | 630 | 35 | 0.36 |
| 16 | ● | occurred | — | 44 | 0.47 |
| 17 | ● | " | — | 37 | 0.44 |
| 18 | ○ | nil | 710 | 103 | 0.74 |
| 19 | ● | occurred | — | 34 | 0.34 |
| 20 | ○ | nil | 680 | 26 | 0.35 |
| 21 | ● | " | 770 | 63 | 0.34 |
| 22 | ● | " | 780 | 64 | 0.46 |

Note)
○: weldability: excellent
●: weldability: inferior

As described above, when welding is carried out by using the wire for gas shield arc welding according to the present invention, a weld metal having high strength and high toughness and excellent in weld crack resistance and in $CO_2$ corrosion resistance is obtained. The wire according to the present invention is particularly suitable for circumferential welding of line pipes for transporting $CO_2$-containing oil and natural gasses, and can provide a circumferential weld metal having excellent selective corrosion resistance. Therefore, the present invention can have great industrial effects.

We claim:

1. A line pipe for transporting $CO_2$-containing oil or natural gas, said line pipe having a weld having high carbonic acid gas corrosion resistance on a circumference thereof, said weld made in the field by gas shield arc welding using a welding wire, said welding wire having a composition consisting essentially of 0.01 to 0.06 wt % of C, 0.10 to 0.60 wt % of Si, 0.9 to 3.2 wt % of Mn, 0.7 to 2.0 wt % of Cr, 0.005 to 0.06 wt % of Ti, not greater than 0.08 wt % of Al and the balance of Fe and unavoidable impurities.

2. A line pipe for transporting $CO_2$-containing oil or natural gas according to claim 1 wherein said wire composition further contains 0.05 to 0.30 wt % Cu.

3. A line pipe for transporting $CO_2$-containing oil or natural gas according to claim 1 wherein said unavoidable impurities of said wire composition are not greater than 0.030 wt % of P, not greater than 0.030 wt % of S, not greater than 0.02 wt % of Nb, not greater than 0.02 wt % of V, not greater than 3.0 wt % of Ni, not greater than 1.0 wt % of Mo, not greater than 0.05 wt % of Zr, not greater than 0.002 wt % of B, not greater than 0.01% of N or not greater than 0.008 wt % of O.

* * * * *

UNITED STATES PATENT AND TRADEMARK OFFICE
CERTIFICATE OF CORRECTION

PATENT NO.   : 5,723,089
DATED        : March 3, 1998
INVENTOR(S)  : Rikio CHIJIIWA, et al.

It is certified that error appears in the above-identified patent and that said Letters Patent is hereby corrected as shown below:

Column 2, line 29, change "comperison" to --comparison--.

Column 5, line 46, change "invention" to --Invention--.

Column 8, line 6, change "0.01%" to --0.01 wt %--.

Signed and Sealed this

Sixteenth Day of March, 1999

Attest:

Q. TODD DICKINSON

Attesting Officer

Acting Commissioner of Patents and Trademarks